F. G. & W. F. NIEDRINGHAUS.
SPOUTS AND STRAINERS.

No. 189,641. Patented April 17, 1877.

ATTEST
Paul Bakewell
John J. Squire

INVENTORS.
Frederick G. Niedringhaus.
William F. Niedringhaus.
By Chas. D. Moody:
their atty:

UNITED STATES PATENT OFFICE.

FREDERICK G. NIEDRINGHAUS AND WILLIAM F. NIEDRINGHAUS, OF ST. LOUIS, MISSOURI.

IMPROVEMENT IN SPOUTS AND STRAINERS.

Specification forming part of Letters Patent No. 189,641, dated April 17, 1877; application filed March 7, 1877.

*To all whom it may concern:*

Be it known that we, FREDERICK G. NIEDRINGHAUS and WILLIAM F. NIEDRINGHAUS, residents of St. Louis, Missouri, have made a new and useful Improvement in the Mode of Attaching Spouts and Strainers of Vessels of Enameled Sheet-Iron Ware, of which the following is a full, clear, and exact description, reference being had to the annexed drawing, making part of this specification, in which—

Figure 1:
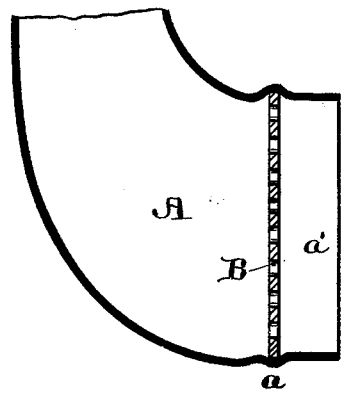
Figure 2:
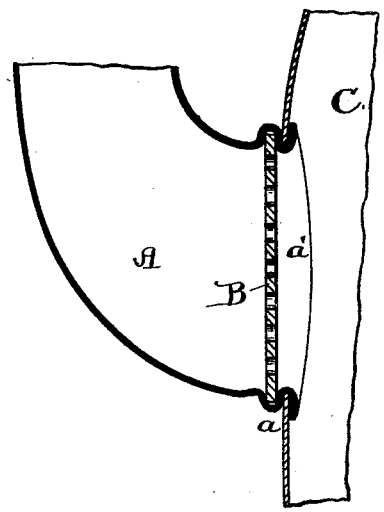

Figure 1 is a sectional view, showing the lower or inner end of the spout and the strainer, and as prior to the attachment to the body of the vessel; and Fig. 2, a similar view, showing the spout and strainer as attached to the vessel.

Similar letters refer to similar parts.

In the annexed drawing, A represents the spout; B, the strainer; and C, the body of the vessel. The spout is made ready for attachment by swelling it slightly outward so as to form a fold or corrugation $a$, Fig. 1, into which the strainer B is sprung, as shown. The inner end $a'$ of the spout, and which is made to fit the spout-opening, is then passed into the body C as far as the corrugation or thereabout, and then, by means of suitable appliances, the inner end $a'$ is turned up upon the inside of the body C, forming a flange around the spout-opening, and the corrugation $a$ flattened and closed down upon the outside of the body. The vessel is then coated with an enamel, serving to close the joint and give the vessel a finished appearance.

We claim—

1. In vessels of enameled sheet-iron ware, the spout A, having the corrugation $a$, and flange $a'$, and the body C, combined substantially as described.

2. In vessels of enameled sheet-iron ware, the spout A, having the corrugation $a$ and flange $a'$, the strainer B, and body C, combined, substantially as described.

F. G. NIEDRINGHAUS.
WM. F. NIEDRINGHAUS.

Witnesses:
CHAS. D. MOODY,
SAML. S. BOYD.